US005777551A

United States Patent [19]
Hess

[11] Patent Number: 5,777,551
[45] Date of Patent: *Jul. 7, 1998

[54] PORTABLE ALARM SYSTEM

[76] Inventor: Brian K. Hess, 403 Aylesbury Dr. South, Westerville, Ohio 43081

[*] Notice: The term of this patent shall not extend beyond the expiration date of Pat. No. 5,587,701.

[21] Appl. No.: 717,569

[22] Filed: Sep. 23, 1996

Related U.S. Application Data

[63] Continuation-in-part of Ser. No. 303,950, Sep. 9, 1994, Pat. No. 5,587,701.

[51] Int. Cl.$^6$ ............................................... G08B 13/00
[52] U.S. Cl. ........................ 340/541; 340/539; 340/545; 340/693; 379/44; 455/90
[58] Field of Search ........................ 340/541, 539, 340/545, 546, 693, 691, 326, 331, 538, 574; 379/40, 44, 51, 56, 57, 106; 455/575, 90

[56] References Cited

U.S. PATENT DOCUMENTS

| | | | |
|---|---|---|---|
| 4,091,371 | 5/1978 | Mason, Jr. et al. | 340/546 |
| 4,194,193 | 3/1980 | McDonough | 340/545 |
| 4,222,119 | 9/1980 | Brunner-Schwer | 340/546 X |
| 4,264,899 | 4/1981 | Menzies et al. | 340/546 |
| 4,435,701 | 3/1984 | Baon | 340/546 |
| 4,520,351 | 5/1985 | Altman et al. | 340/574 |
| 4,667,188 | 5/1987 | Schwartz | 340/689 |
| 4,719,454 | 1/1988 | Hopkins et al. | 340/574 |
| 4,904,983 | 2/1990 | Mitchell | 340/426 |
| 4,908,604 | 3/1990 | Jacob | 340/539 |
| 4,910,493 | 3/1990 | Chambers et al. | 340/426 |
| 4,951,029 | 8/1990 | Severson | 340/539 X |
| 4,964,156 | 10/1990 | Blair | 379/189 |
| 5,081,667 | 1/1992 | Drori et al. | 379/59 |
| 5,117,223 | 5/1992 | Tanner | 340/693 |
| 5,144,661 | 9/1992 | Shamosh et al. | 380/9 |
| 5,164,705 | 11/1992 | Dunagan et al. | 340/547 |
| 5,200,735 | 4/1993 | Hines | 340/539 |
| 5,225,713 | 7/1993 | Henneberry et al. | 307/102 |
| 5,255,306 | 10/1993 | Melton et al. | 379/38 |
| 5,289,534 | 2/1994 | Lester et al. | 340/545 X |
| 5,311,570 | 5/1994 | Grimes et al. | 379/57 |
| 5,319,698 | 6/1994 | Glidewell et al. | 340/541 X |
| 5,512,881 | 4/1996 | Majmudar | 340/574 |
| 5,587,701 | 12/1996 | Hess | 340/541 |

*Primary Examiner*—Thomas J. Mullen, Jr.
*Attorney, Agent, or Firm*—Standley & Gilcrest

[57] ABSTRACT

A portable alarm system is disclosed in which the alarm functions are contained within a portable enclosure, communication is maintained between the alarm system and wireless security contacts placed at points of entry, and the alarm is capable of initiating a telephone call to a security monitor state either by conventional hard-wired telephone lines within a building or by cellular transmission.

13 Claims, 3 Drawing Sheets

PORTABLE ALARM SYSTEM

This is a continuation-in-part of application Ser. No. 08/303,950 filed Sep. 9, 1994 which is now U.S. Pat. No. 5,587,701 issued on Dec. 24, 1996.

BACKGROUND AND SUMMARY OF THE INVENTION

The present invention relates generally to alarm systems, and more particularly, to a portable alarm system for use in a residence, boat, office, or any other structure which may benefit from security monitoring.

Alarm systems of various types have been in existence for many years. In known home alarm systems, the components are usually hard-wired throughout a home with the wiring usually terminating at a control panel located somewhere within the home. One of the chief drawbacks of such a system is that the alarm system is permanently installed in the home which offers little or no value to the original purchaser of the alarm system when he or she moves from the home. Furthermore, the installation of such an alarm system is labor intensive and, therefore, costly. The present invention may perform all the functions found in traditional home alarm systems as well as additional new functions. Furthermore, the present invention is easily portable (i.e., able to be carried in one hand by an adult or teenager), externally wireless in one embodiment, capable of placing a call without the need of a hard-wired telephone system, and resistant to shock.

The present invention comprises a portable alarm apparatus that incorporates wireless technology along with cellular telephone service technology, for example, to provide a unique and effective deterrent to illegal entry. The preferred embodiment of the present invention is capable of sounding a high-decibel alarm, and contacting a security monitor station via cellular or other wireless telephonic transmission technology. The present invention is equipped to monitor door and window entries and can sense motion within a room with a preferred motion detector as well as sense smoke with a smoke detector and transmitter communicating in a wireless manner with the microprocessor of the present invention. The present invention is the only alarm system currently known which offers the following preferred features:

1) is portable,
2) offers wireless connections to doors and windows,
3) incorporates cellular or other wireless telephonic technology,
4) is contained in a single, unique, shock-proof enclosure that is small enough to be easily transported from place to place,
5) is intended to be a substitute for a traditional hard-wired home alarm system,
6) may be operated from an AC outlet; and
7) is enclosed in a shock-proof enclosure.

Home alarm systems are frequently connected to the home's telephone wiring system to automatically place a call to a monitor station at some distance away from the home to warn those at the monitor station that a possible illegal entry has occurred. This, in theory, enables those at the monitor station to either send a security officer to the home or place a call to the police to initiate inspection of the home where the alarm was activated. A drawback of this type of system is that sophisticated burglars are knowledgeable of such systems and will cut the telephone wires prior to entry into the home, thereby rendering the security monitor station useless (because when the illegal entry occurs, the system will not function to place the automatic call to the security monitor station). The present invention solves this problem by using a cellular phone transmission means. Additionally, the cellular communication means is enclosed within the alarm system enclosure and is adapted to run off the power supplied by an AC outlet or a backup power source within the enclosure.

Thus, the present invention makes a significant contribution to the art by being the first wireless, wireless alarm system made portable. The first "wireless" is in reference to the fact that the present invention does not require wires to be installed. The second "wireless" is in reference to the fact that the invention may be cellular. The integration of these two "wireless" features into a small, easily portable, enclosure is unique and provides a very beneficial product to consumers.

The present day security alarm system market offers few alternatives for the millions of citizens that live in apartments (where they are unlikely to spend significant amounts of money to install a permanent hard-wired alarm system when they may not be living in the apartment for more than a relatively short amount of time), a hotel room, a leased office space, short term warehousing, motor homes, construction trailers, and a multitude of other environments in which a person would not intend to stay for a relatively long period of time and thus would not wish to invest a significant expense in a permanent alarm system. It is exactly these environments where crime is often the highest. Therefore a need exists for an alarm system that is portable, which is relatively inexpensive, which is easy to use, and which does not have to rely on a building's installed telephone lines or power lines.

The present invention comprises a portable enclosure; a microprocessor installed within the enclosure; a wireless receiver installed within the enclosure and electrically connected to the microprocessor for receiving alarm signals from intruder sensing devices; a communications means, in electric communication with the microprocessor, for initiating a telephone call to a location away from the place in which the alarm system is located; an interface control panel in electric communication with the microprocessor for programming the alarm system according to specific user needs.

It is also preferred that the portable alarm system be comprised of an enclosure with a shock-proof construction comprising reinforced ribbing in an injection molded plastic enclosure.

It is also preferred that the alarm system of the present invention be further comprised of: a motion sensor electrically connected to the microprocessor for detecting intrusion into the protected area; an LED board electrically connected to the microprocessor for indicating the current status of the alarm system; an audio siren electrically connected to the microprocessor; a strobe light electrically connected to the microprocessor; a back-up power source or battery electrically connected to the microprocessor for providing back-up power to the microprocessor; a surveillance camera electrically connected to the microprocessor and secured within the enclosure for visually monitoring the premises and transmitting a picture or series of pictures to a monitor station and a key switch, electrically connected to the battery for turning off the battery during storage.

DETAILED DESCRIPTION OF THE PREFERRED EMBODIMENT(S)

Figure 1:
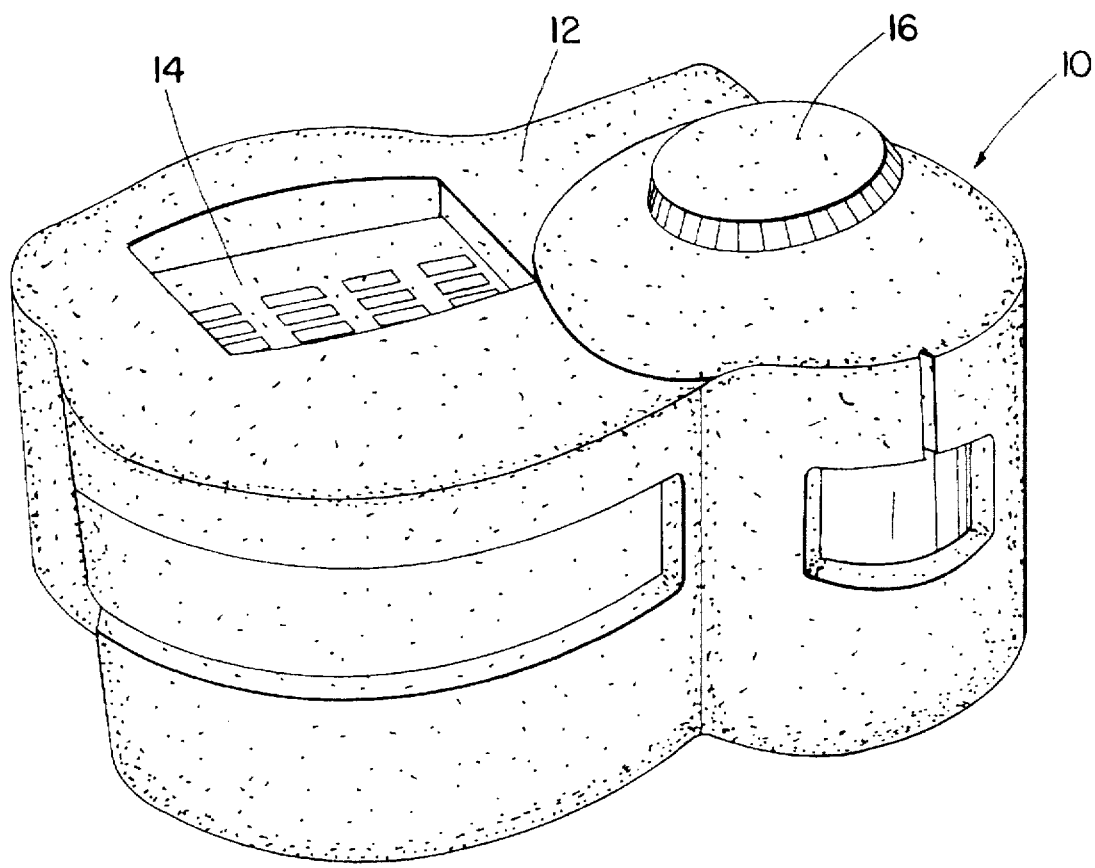
FIG. 1 is a perspective view of one embodiment of the present invention.

Novel features and advantages of the present invention in addition to those mentioned above will become apparent to those skilled in the art from a reading of the following detailed description in conjunction with the accompanying drawings wherein similar reference characters refer to similar parts and in which:

FIG. 1 is a perspective view of one embodiment of the present invention. The portable alarm system 10 is contained in a portable enclosure 12. A keypad, or interface control panel 14, can be used to program the alarm system 10 according to specific user needs. A strobe light 16 is preferably contained in the enclosure 12.

The enclosure 12 is preferably formed from a shock-proof plastic material although other materials may also work well. A preferred material for the enclosure 12 is a shatterproof polycarbonate/ABS that is resistant to attempts to destroy it by throwing, kicking, or jumping on it. An illegal intruder may attempt to disable the apparatus of the present invention when the audio alarm sounds. With the enclosure 12 made of a material that resists impacts, the alarm may continue to sound and eventually cause the intruder to abandon efforts to disable it. The plastic may be formed into its desired shape by known processes such as blow molding or injection molding. The enclosure 12 of the present invention is also preferably formed of a unique ribbed construction which is explained in further detail below.

Figure 2:
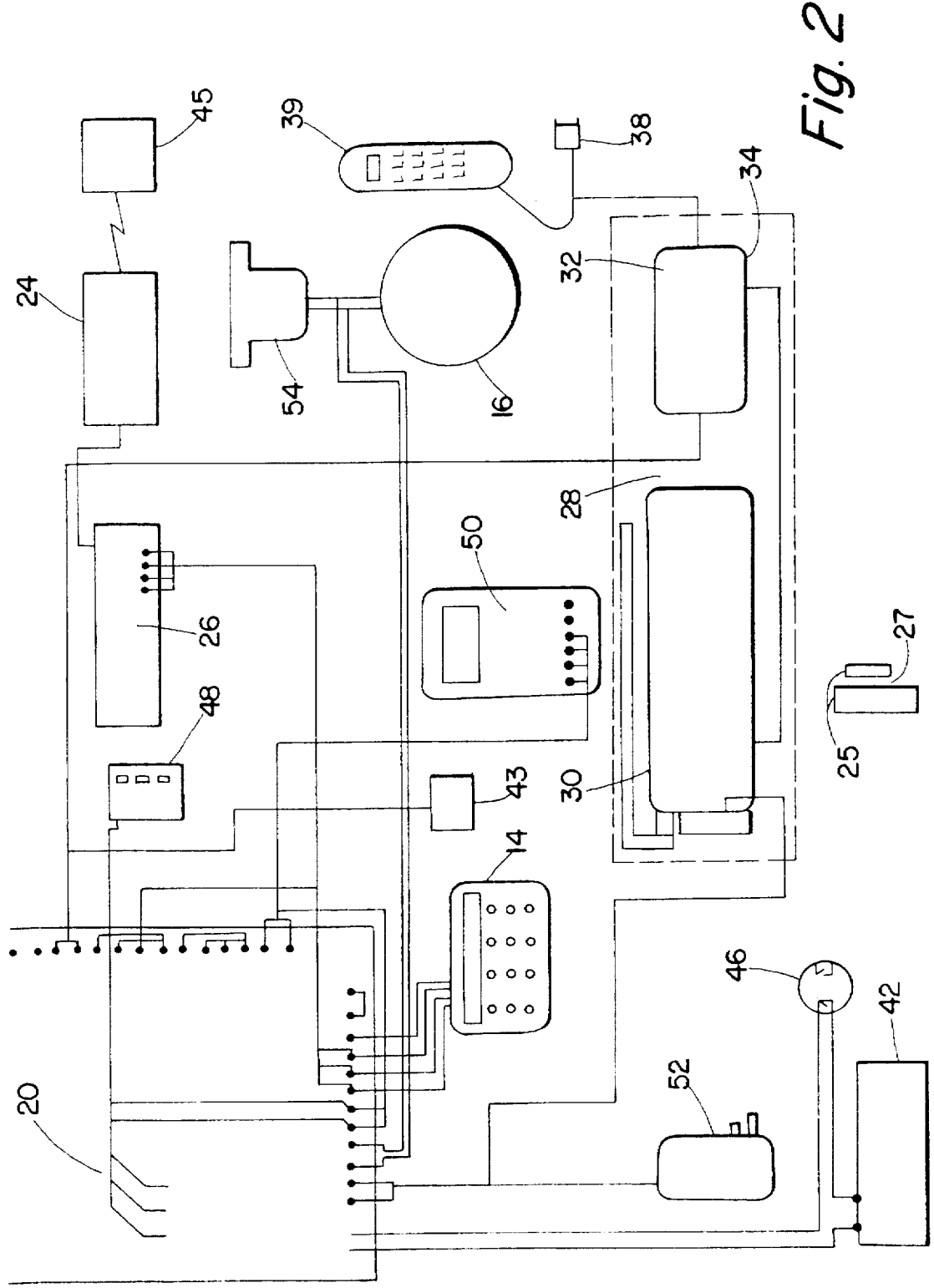
FIG. 2 is a schematic of the present invention.

FIG. 2 is a schematic of one embodiment of the present invention. FIG. 2 depicts the elements of the alarm system that may be contained in the portable enclosure 12. The alarm system 10 is controlled by the microprocessor 20. The microprocessor 20 is a microcomputer based control panel. In one embodiment, the alarm microprocessor 20 is a commercially available microprocessor alarm board that may be supplied by any of a number of alarm board suppliers that are well known in the alarm industry. In the preferred embodiment, the microprocessor 20 is connected to a power transformer 52 to provide current to the microprocessor from a source such as a conventional wall outlet. The microprocessor 20 processes the data received at its various inputs and sends appropriate signals to the other components of the alarm system 10 according to the received inputs—this is discussed in further detail below.

A key pad control, or interface control panel 14, is electrically connected to the microprocessor 20. The interface control panel 14 is used to program the alarm system 10 according to specific user needs. In the preferred embodiment, the interface control panel 14 is capable of multiple user codes which may be inputted to arm/disarm the alarm system 10. Additionally, the interface control panel 14 preferably contains a Panic/Ambush feature which allows the user to activate the alarm sequence (e.g. activate the siren, strobe light, and call) by the push of one or two buttons. The interface control panel 14 may also be used to send a silent distress signal by actuating predetermined code numbers on the interface control panel 14. The interface control panel 14 also allows the user to program the alarm system 10 based on specific user needs. For example, the user may program the alarm system to monitor all, or specific, intruder zones, discussed in more detail below, or program specific call parameters.

A wireless receiver 24 is installed within the enclosure 12 and electrically connected to the microprocessor 20. The receiver 24 receives alarm signals from intruder sensing devices which may be placed at doors, windows, or any other aperture to be monitored. These intruder sensing devices are comprised of transmitters which send signals (such as report zone status and supervision information) to the wireless receiver 24. The receiver 24 includes a wired interface 26 to the microprocessor 20.

A communications means 28 capable of initiating a telephone call to a location away from the place in which the alarm system 10 is located, such as a remote security station, is also preferably contained in the enclosure. In one embodiment, the telephone connection is through a standard telephone jack located on the premises being secured. In another (preferred) embodiment, the communication means 28 is a cellular phone 30. The cellular phone 30 is a radio transmitter and receiver. When the phone 30 is on, an externally mounted antenna is part of the phone 30 that sends out and receives radio frequency energy. In the preferred embodiment, the phone 30 operates in the frequency range of 824 mhz to 894 mhz and employs commonly used frequency modulation techniques. Additionally, the phone 30 may transmit at a power level that can range from 0.005 to 3 watts. When instructed by the microprocessor 20, the phone 30 will place a call to the central station (e.g. when an intruder has been detected). A call may also be initiated to inform of a low battery condition in the alarm system 10. The phone 30 may also be used as another means of ordinary nonemergency communication (e.g. as a regular cellular phone).

When cellular technology is incorporated, a cellular data interface unit 32 is built into the receiver of the cellular phone 30 to formulate a "tip and ring" which is commonly associated with a dial tone on standard telephone systems. The tip and ring is initiated by the cellular transceiver and a call goes out to a cell site. From the cell site a signal is sent to a mobile telephone subscriber's office (MTSO). From the MTSO, the call is typically forwarded to the land line telephone company and from there to its final destination (e.g.—the security monitor station or 911 office). The cellular data interface unit 32 is preferably connected to the cellular phone 30 out of the RJ45 jack on the side of the cellular data interface unit 32 at 34. The RJ45 jack, at 36, connects to the RJ45 receptacle 38 on the side of the alarm 10. A cellular hand set 39 may be plugged into this receptacle 38, allowing the alarm system 10 to be used as a regular cellular telephone. This is advantageous since the alarm system may be used to make telephone calls independent of the functioning of the alarm system. By plugging a cellular hand set 39 into the alarm 10, specifically in the receptacle at 38, any type of phone call may be made, social or business, via the alarm system 10. Thus if the alarm system 10 is taken to secure a vacation cabin home for a weekend in the mountains, the alarm system 10 may also be used with a cellular hand set 39, to make desired phone calls.

A battery 42 acts as a back-up power supply to the microprocessor 20. It is recharged by receiving a trickle charge from the microprocessor 20.

Additionally, the alarm system 10 may incorporate a keyswitch 46 which makes it possible to turn off the battery 42, in the event the alarm system 10 will be without AC power for an extended period of time (e.g. storage during moving). When the alarm system 10 sits inactive for a long period of time without AC power, the battery 42, may eventually be drained of all charge. The keyswitch 46 may be switched to isolate the battery 42, from the microprocessor 20 when the alarm system 10 is not in use so that the battery 42, will not be drained.

The invention may also include a miniature surveillance camera 43. One such camera is available from TVX, Inc., model TVX-01, in Broomfield, Colo. The camera is electrically connected to the microprocessor.

Figure 4:
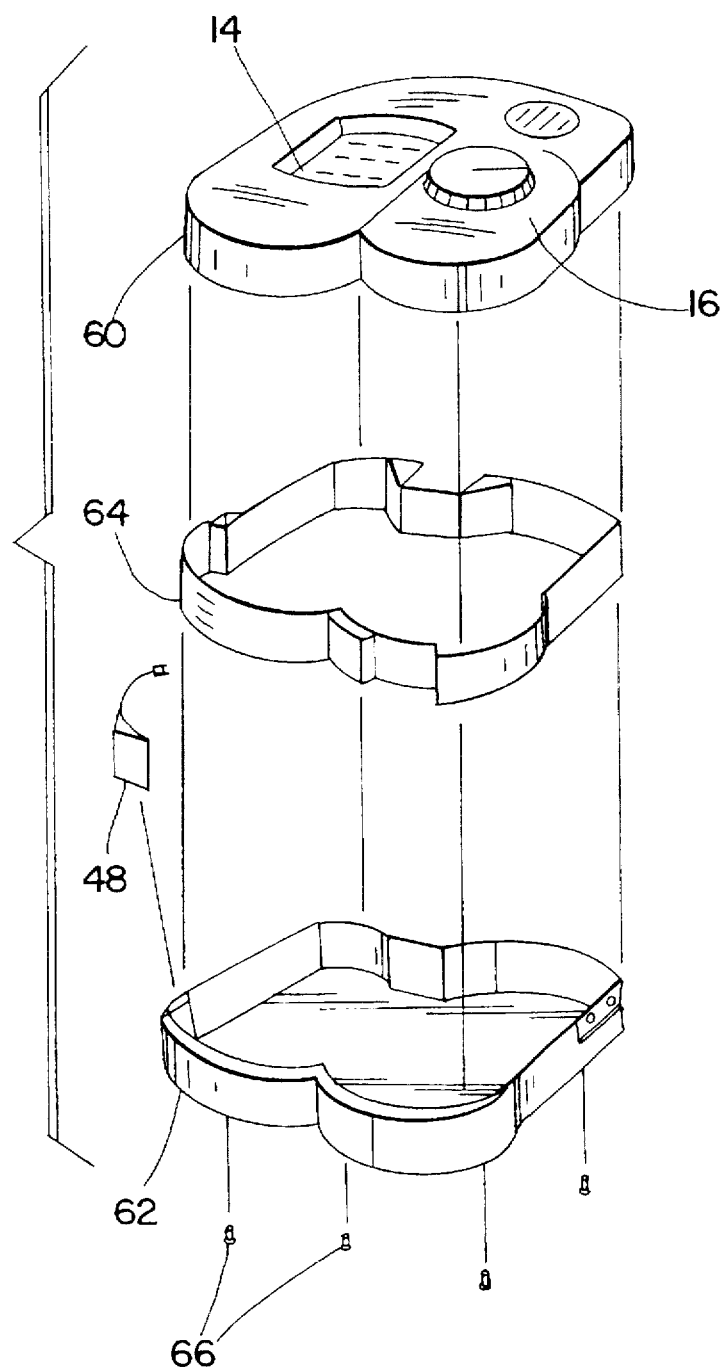
FIG. 4 is an exploded view of the shock-proof enclosure.

FIG. 4 is an exploded view of the shock-proof enclosure of the present invention. The enclosure is preferably comprised of a lid exterior 60 and a bottom exterior 62, and a body portion 64. The body 64 fits between the lid exterior 60 and the bottom exterior 62. The construction insulates the components of the alarm system 10 from shock. In the preferred embodiment, the top lid 60 is a single piece injection molded plastic construction. The same is true of the body 64 and the bottom 62. The microprocessor and other electronic components are placed within the body 64 protecting the components from potential impact. The body 64 and lid 60 may be bolted to the bottom 62 by bolts 66.

Additionally, in the preferred embodiment, the alarm system 10 also contains a motion sensor 50, an LED board 48, a strobe light 16, power transformer 52, and an audio siren 54.

FIG. 2 is an example of one embodiment of the present invention. The microprocessor 20 is wired from locations 1, 2 to a transformer 52 that may be connected to an AC outlet. The interface control panel 14 is wired to locations 7, 8, 9, 10 on the microprocessor 20.

The motion sensor 50 is preferably a combination passive infrared sensor (PIR) and microwave sensor; both contained in a single package. The motion sensor 50 will send an activation signal to the microprocessor when both infrared and microwave sensors detect intrusion at the same time. The PIR section operates by detecting a rapid change in temperature when an intruder crosses a protected area. When a beam emanating from the sensor experiences a change in heat (projected back through a lens in the sensor) a pulse is generated by the sensor element. The microwave transmitter sends out a short burst of radio frequency energy, and the receiver detects changes in the returned signal caused by motion within the covered area. The motion sensor 50 is preferably wired to locations 5, 6, 13, 14 on the microprocessor 20. Motion sensors 50 may be purchased from a variety of manufacturers. A preferred range for the motion detector would be sufficient to adequately cover the area of a large room, preferably out to a 35 foot range from the location of the motion detector.

When the alarm system 10 is armed, a violation of the protected area will send a message to the microprocessor 20. Upon receiving a signal indicating a violation has occurred, the microprocessor 20 will activate the siren 54 and the strobe light 16 along with placing a call to the central station. The audio siren 54 and strobe light 16 are used as visual and audible deterrents. The strobe light 16 flashes a bright light preferably at a rate of 60 to 100 per minute, for example. Preferably, the strobe light 16 remains flashing after the alarm system 10 has reset. The user/owner of the alarm may be required to turn off the strobe. In this way, the strobe will stay on to warn the user/owner upon returning to the residence that a break-in has occurred. The strobe remains flashing after a break-in by either the AC power source or battery back-up, supplying power to the strobe. The siren 54 preferably produces a loud warble tone at 82 to 110 dBa at a frequency of 2900+/−500 Hz, for example. The audio siren 54 is preferably flush-mounted to a surface of the enclosure 20. The strobe light 16 and siren 54 are both preferably wired to locations 3, 4 on the alarm control panel 20.

Figure 3:
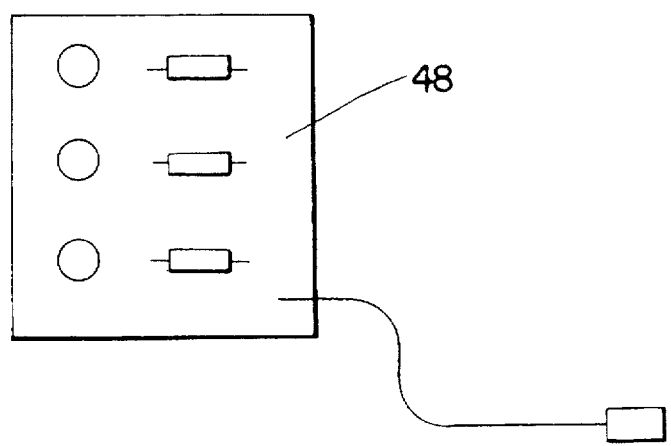
FIG. 3 is a circuit schematic of the LED board.

The LED board 48 is preferably used to display three different types of status signals, based on the status of the alarm control panel 20. The first status LED emits a steady yellow light when AC power is present. The second status LED emits a flashing red light when the alarm system 10 has been activated. The third status LED emits a steady green light when the alarm system is ready. (FIG. 3 is a circuit schematic of one embodiment of the LED board 48.) The LED board 48 is preferably wired to locations 5, 6, E14, E15, E4 on the microprocessor 20.

The cellular data interface unit 32 is connected to the cellular phone 30 out of the RJ45 jack on the side of the cellular data interface unit 32 at 34. The RJ45 jack, at 36 connects to the RJ45 receptacle 38 on the side of the alarm 10.

The cellular phone 30 may be wired to location 1, 2 on the microprocessor 20. The wireless smoke detector 45 communicates to receiver 24 and reports to the monitoring station which complies with commercial fire code standards. The camera lens 43 is connected to the microprocessor board 20.

The interface control panel 14 can be used to deactivate the audio siren, to program the telephone number of a security monitor station into the alarm system 10, and to enter a user code that would enable the owner of the alarm system 10 to deactivate the device during a predetermined time immediately upon entry into the alarm owner's residence.

Wireless security contact switch 25, or other intruder sensing devices, are placed on doors and windows of the residence to be secured. If a door or window is opened while the alarm is set, the alarm will be activated. The breaking of the switch connection 27 at the security contacts, at the point of entry, causes a signal to be received at the wireless receiver 24. Once the intruder signal has been received by the receiver 24, the microprocessor will send appropriate signals which activate the audio siren 54, the strobe light 16, and the cellular phone 30, which places a call to a security monitor station.

The alarm system 10 may be programmed through the interface control panel 14 to interact with different intruder zones within a secured residence. For example, zone 1 may be the front door of a residence. Zones 2, 3, and 4 may be specific windows of the residence. The alarm system 10 may be programmed to have a delay of 30 seconds at zone 1, and no delay at zones 2–4. With no delay, the alarm system 10 would be immediately activated once an illegal entry has been made.

The alarm system 10 of the present invention provides an efficient, inexpensive, easily portable alarm system which preferably contains wireless cellular technology that may be used to protect residences, temporary apartments, hotel rooms, campgrounds, cabins, boats and virtually any other area which may need to be secured.

Although preferred embodiments of the present invention have been described above, the present invention is susceptible to several variations and implementations which take advantage of the technology described herein and which would fall under the scope of coverage granted hereby. The description contained herein is not to be considered as limiting the scope of the invention, but is offered for an example of how the present invention may be implemented.

What is claimed is:

1. A portable alarm system, comprising:

a portable enclosure;

a microprocessor secured within said enclosure;

a wireless receiver adapted to receive an alarm signal from at least one zone at a structure being monitored, said wireless receiver secured within said enclosure and electrically connected to said microprocessor; and, a communications device secured within said enclosure and in electrical communication with said microprocessor and independent of any hard-wired telephone lines connected to said structure, said communication device adapted to initiate and complete a wireless transmission when said receiver receives said signal, to a location apart from said structure.

2. The portable alarm system of claim 1, wherein said enclosure is comprised of:

a bottom, a lid, and a body portion, made from injection molded polycarbonate/ABS plastic, thereby providing shock resistance.

3. The portable alarm system of claim 1, wherein said communication device is a wireless cellular phone communication system.

4. The portable alarm system of claim 3, wherein said cellular phone communication system is adapted to be used as a conventional cellular phone independent of the alarm system functions.

5. The portable alarm system of claim 1, further comprising:

a motion sensor for detecting intrusion into a protected area, said motion sensor electrically connected to said microprocessor and within said enclosure.

6. The portable alarm system of claim 1, further comprising:

an LED board electrically connected to said microprocessor and within said enclosure for indicating the current status of said alarm system.

7. The portable alarm system of claim 1, further comprising:

an audio siren electrically connected to said microprocessor and within said enclosure; and a strobe light electrically connected to said microprocessor and within said enclosure.

8. The portable alarm system of claim 1, further comprising:

a back-up battery, electrically connected to said microprocessor, for providing back-up power to said microprocessor.

9. The portable alarm system of claim 8, further comprising:

a key switch, electrically connected to said battery, for turning off said battery during storage.

10. The portable alarm system of claim 1, further comprising a surveillance camera electrically connected to said microprocessor and secured within said enclosure.

11. The portable alarm system of claim 1, further comprising:

a cellular handset adapted to reside at said portable enclosure so that cellular phone calls may be made through said alarm system.

12. The portable alarm system of claim 1, wherein said wireless transmission is a cellular phone call.

13. A portable alarm system, comprising;

a portable enclosure;

a microprocessor secured within said enclosure;

a wireless receiver secured within said enclosure and electrically connected to said microprocessor, for receiving an alarm signal from at least one sensing device;

a wireless phone communication system including a wireless telephone handset, in electric communication with said microprocessor, adapted for initiating a wireless call to a location away from the place in which said alarm system is located without use of said handset, when said alarm signal is received, and wherein said wireless phone communication system is also adapted for initiating a wireless call to a location away from the place in which said alarm system is located with manual use of said handset; and a power source, electrically connected to said microprocessor, for providing power to said microprocessor.

* * * * *